US008757551B2

(12) United States Patent
Margalit

(10) Patent No.: US 8,757,551 B2
(45) Date of Patent: Jun. 24, 2014

(54) FOREIGN OBJECT DAMAGE PROTECTION DEVICE AND SYSTEM FOR AIRCRAFT

(76) Inventor: Zamir Margalit, West Orange, NJ (US)

( * ) Notice: Subject to any disclaimer, the term of this patent is extended or adjusted under 35 U.S.C. 154(b) by 0 days.

(21) Appl. No.: 13/487,415

(22) Filed: Jun. 4, 2012

(65) Prior Publication Data

US 2013/0320103 A1 Dec. 5, 2013

(51) Int. Cl.
*B64D 1/00* (2006.01)
(52) U.S. Cl.
USPC .............................. 244/136; 239/171; 55/306
(58) Field of Classification Search
USPC ....... 244/136, 134 R, 134 C, 134 F; 239/171; 55/306
See application file for complete search history.

(56) References Cited

U.S. PATENT DOCUMENTS

| 1,364,152 | A | * | 1/1921 | Steinmetz | 244/136 |
|---|---|---|---|---|---|
| 3,121,545 | A | | 2/1964 | Meletiou | |
| 3,905,566 | A | * | 9/1975 | Anderson | 244/53 B |
| 4,644,683 | A | * | 2/1987 | Jones | 47/1.41 |
| 4,736,907 | A | * | 4/1988 | Steffen | 244/1 R |
| 6,536,202 | B2 | * | 3/2003 | Lo | 60/39.092 |
| 6,769,493 | B1 | * | 8/2004 | Fima et al. | 169/53 |
| 7,753,314 | B2 | * | 7/2010 | Nolan | 244/136 |
| 7,783,400 | B1 | * | 8/2010 | Zimler | 701/36 |
| 7,803,204 | B1 | | 9/2010 | Mladinich | |
| 7,837,149 | B2 | * | 11/2010 | Mackin | 244/134 F |
| 8,047,903 | B1 | | 11/2011 | Schiff | |
| 8,052,767 | B2 | | 11/2011 | Sands et al. | |
| 2006/0032983 | A1 | * | 2/2006 | Brand et al. | 244/134 R |
| 2006/0097111 | A1 | * | 5/2006 | Wood et al. | 244/134 C |
| 2006/0175429 | A1 | * | 8/2006 | Lanigan et al. | 239/171 |
| 2010/0001089 | A1 | * | 1/2010 | Vazquez Serrano et al. | .. 239/2.1 |
| 2010/0192834 | A1 | * | 8/2010 | Fogiel | 116/22 A |
| 2011/0125349 | A1 | | 5/2011 | Ace | |

OTHER PUBLICATIONS

Federal Aviation Administration, About the FAA Wildlife Strike Database, reprinted from the Internet on Jan. 18, 2012, from http://wildlife-mitigation.tc.faa.gov/wildlife/default.aspx.
Bird Strike Committee USA, Understanding and reducing bird and other wildlife hazards to aircraft, reprinted from the Internet on Jan. 20, 2012, from www.birdstrike.org.

* cited by examiner

*Primary Examiner* — Timothy D Collins
*Assistant Examiner* — Jamie S Stehle
(74) *Attorney, Agent, or Firm* — Benjamin Appelbaum

(57) ABSTRACT

A foreign object damage protection system comprises a sensor for detecting a foreign object, a fluid in a reservoir, a means for dispensing the fluid, the means for dispensing the fluid in communication with the reservoir, and a control unit, whereby when the sensor detects a foreign object, the control unit causes fluid to be dispensed from the reservoir through the means for dispensing and towards the foreign object. The sensor is attachable to one or more locations on an aircraft, such as a wing, nose, windshield, fuselage or tail. The sensor can be a radar sensor, weather radar sensor, weather radar sensor modified to detect objects at short ranges, infra-red sensor, forward-looking infrared sensor, a light detection and ranging sensor, motion sensor, thermal sensor, or video sensor. The system provides a way to protect an aircraft from striking foreign objects, such as birds, in the path of the aircraft.

17 Claims, 9 Drawing Sheets

FOREIGN OBJECT DAMAGE PROTECTION DEVICE AND SYSTEM FOR AIRCRAFT

FIELD OF THE INVENTION

Embodiments of the present invention relate to a foreign object damage ("FOD") protection device and system for aircraft. An embodiment is designed to prevent the entry of foreign objects, such as birds, into the engine of an aircraft, particularly during flight. The device shoots a concentrated stream of liquid at the foreign object, with the force of the contact between the liquid stream and the object either destroying the object, or deflecting the object out of the path of the oncoming aircraft. An alternate embodiment prevents contact of a foreign object with the aircraft windshield. An embodiment could be used on fixed wing aircraft, such as jet planes or propeller-driven aircraft, and other embodiments could be adapted for use on rotor craft (also referred to as rotary-wing aircraft), such as helicopters, airframes that are capable of vertical take-offs and landings; unmanned aircraft, and other aircraft.

BACKGROUND OF THE INVENTION

In January 2009, a twin engine jet aircraft that had recently taken off from a New York City area airport collided with a flock of geese. Numerous geese were sucked into the engines, causing both engines to fail, but the pilot maneuvered the aircraft into a safe landing on a river. Everyone on board survived this crash, with no serious injuries. Government agencies concluded that this crash was caused by the intake of birds into the engines. In general, there have been an increasing number of news reports about birds striking aircraft, and overall, the number of bird strikes has been increasing in recent years. Some of this increase is due, in part to additional protections for wildlife resulting in increased population, and the location of many airports near bodies of water where these birds are resident.

The Federal Aviation Administration ("FAA") website "FAA Wildlife Strike Database" contains a summary of records kept by the FAA since 1990. The FAA indicates that it has recorded over 121,000 wildlife strikes between 1990-2010 for both civilian and military aircraft. The FAA states that 92% of these bird strikes to commercial aircraft have occurred at or below an altitude of 3500 ft above ground level, and that during the period from 2006 and 2010 there was an average of 26 strikes reported each day. The FAA indicates bird strikes are not a "new" event; Orville Wright reported a bird strike in 1905. The FAA and other governmental agencies keep track of reported bird strikes, and while the reporting form asks for aircraft and flight data, there is no specific field requesting whether the aircraft made contact with birds being overtaken by the aircraft, or by birds flying into the approaching aircraft. U.S. Pat. No. 3,121,545 (Meletiou) refers to a plane crash near Boston in the early 1960's that was caused by the ingestion of a flock of starlings, and discloses a deflector for aircraft engine intakes.

For the year 2010, the U.S. Air Force reported about 5,000 bird strikes; over 9,600 bird strikes were reported for civilian aircraft in the U.S. Large and jet powered aircraft are more subject to engine damage from ingestion of birds, while smaller fixed wing aircraft and helicopters are more prone to windscreen penetration, which can result in injury to pilots or others on board, and may also lead to a loss of control of the aircraft.

Many prior art devices to protect aircraft are passive systems, such as deflectors, engine screens, windshield screens or other types of shielding devices placed over a windshield, or strengthened engine components to protect the aircraft and/or engine, and are "actuated" when the aircraft encounters a foreign object. Embodiments of the present invention, in contrast, employ an active detection and protection system, to prevent the aircraft from being struck by a foreign object by removing that object from the flight path of the aircraft, either by destroying it or deflecting the foreign object out of the path of the aircraft.

Embodiments of the present invention are suitable for use on civilian and military aircraft. In addition to their use on fixed wing aircraft, such as propeller or jet planes, embodiments of the present invention could be adapted for use on rotor craft (also referred to as rotary-wing aircraft), such as helicopters, airframes that are capable of vertical take-offs and landings (such as, for example only, the Harrier and Osprey); unmanned aircraft such as Unmanned Aerial Vehicles ("UAVs"); or other aircraft.

BRIEF SUMMARY OF THE INVENTION

As will be seen in the detailed description section, embodiments of the present invention offer numerous advantages, such as the following:
Ability to save lives;
Reduction of aircraft maintenance costs;
Applicability to both civilian and military aircraft; and
Ability to stimulate the economy by the creation of jobs, by the installation of units on existing airframes, and their installation on newly manufactured airframes.

Embodiments of the present invention include a system and methods for protecting an aircraft from damage from a foreign object. A foreign object damage protection system comprises a sensor for detecting a foreign object, a fluid in a reservoir, a means for dispensing the fluid, the means for dispensing the fluid in communication with the reservoir, and a control unit, whereby when the sensor detects a foreign object, the control unit causes fluid to be dispensed from the reservoir through the means for dispensing and towards the foreign object.

The sensor is attachable to one or more locations on an aircraft, such as a wing, nose, windshield, fuselage or tail. The sensor can be a radar sensor, weather radar sensor, weather radar sensor modified to detect objects at short ranges, infrared sensor, forward-looking infrared sensor, a light detection and ranging sensor, motion sensor, thermal sensor, or video sensor.

When used on an aircraft, system embodiments of the present invention can be pressurized either before flight, or after the aircraft has taken off and reached a specified air speed and altitude (but less than 18,000 feet) above sea level, or without additional pressurization. Embodiments of the present invention could operate independently of the aircraft cabin pressurization system, or embodiments can operate in conjunction with the aircraft cabin pressurization system.

Embodiments of the FOD system provides a way to protect an aircraft from striking foreign objects, such as birds, in the path of the aircraft.

DETAILED DESCRIPTION OF THE INVENTION

Embodiments of the present invention include a foreign object damage protection device and system that are designed to be used on aircraft, and prevent the foreign object from making contact with the aircraft. Embodiments of the present invention prevent damage from ingestion of foreign objects, such as a bird, into an aircraft engine, and also prevent contact of foreign objects with the aircraft windshield. Although these embodiments are intended to be used at any speed, even when the engine is in an off condition or at idling speed, its primary use is for aircraft operating at various levels of power output, including levels of high thrust needed for takeoff, and during flight. These embodiments could be used on civilian and/or military aircraft. In addition to their use on fixed wing aircraft, such as jet planes and propeller driven planes, embodiments of the present invention could be adapted for use on rotor craft (also referred to as rotary-wing aircraft), such as helicopters, airframes that are capable of vertical take-offs and landings (such as, for example only, the Harrier or Osprey); unmanned aircraft, such as Unmanned Aerial Vehicles ("UAVs"); and other aircraft.

Figure 1:
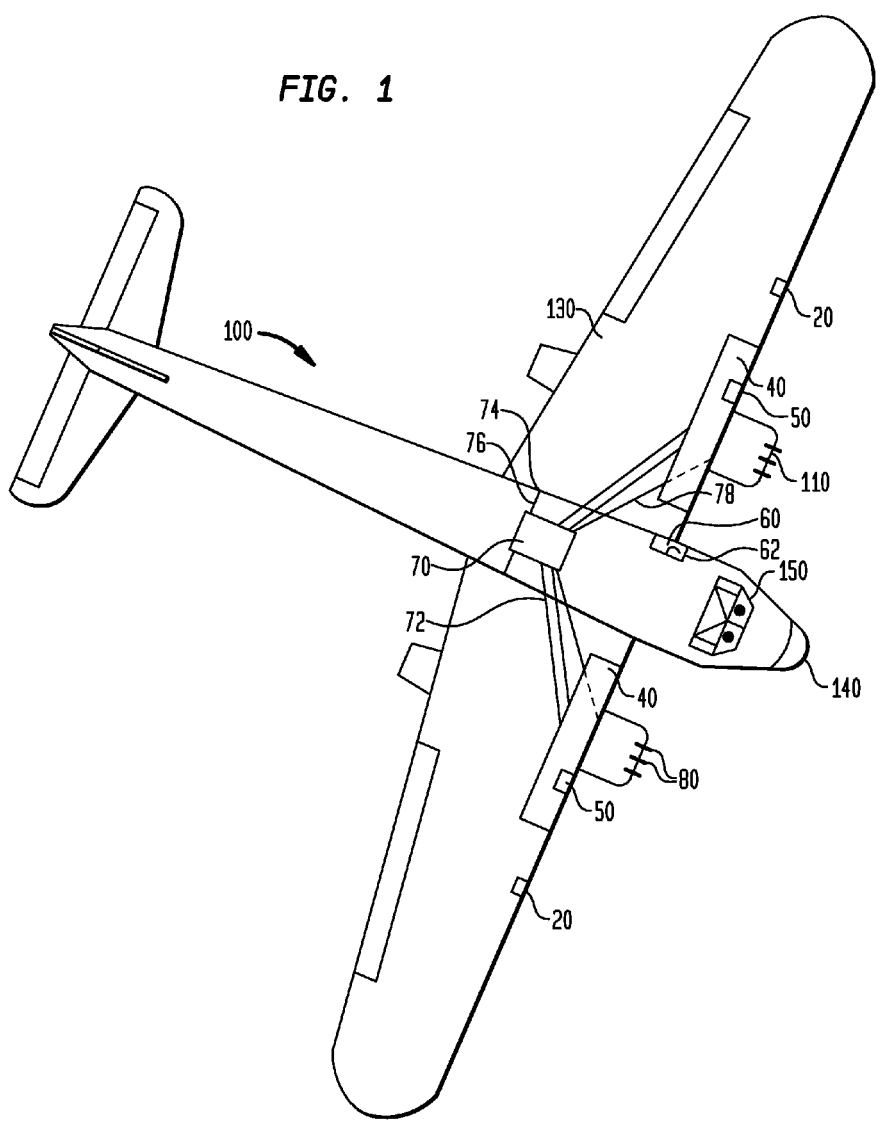
FIG. 1 is a plan view of an aircraft equipped with embodiments of the present invention.

An embodiment of the foreign object damage protection system 10 is shown attached to an aircraft 100 (FIG. 1). In one embodiment, foreign object damage protection system 10 is shown mounted on aircraft 100 which has an engine 110 mounted beneath the aircraft wing 120. Although not shown in the drawings, foreign object protection system 10 could be mounted on an aircraft whose engines are mounted elsewhere, such as between the tail and fuselage (for example, as on the Boeing 727, FOD system 10 could be mounted within a leading portion of the tail), mounted external to the fuselage (for example, as in the A-10 Thunderbolt), or other aircraft whose engines are mounted within the fuselage, for example, fighter aircraft.

The foreign object damage protection system 10 comprises a foreign object detector 20, a reservoir 40 for a fluid, a control unit 60 and a plurality of nozzles 80 mounted on the aircraft 100. The principle is that during flight, the foreign object detector 20 will detect the presence of a foreign object, such as a bird, cause an alert to be sent to the pilot or other member of the aircraft crew, and actuate the control means 60 which can either be integrated into the aircraft's avionics system, or be employed as a separate system within the aircraft. This embodiment of the FOD system 10 provides for automatic activation of the system upon detection of an object. An alternate embodiment gives the pilot the option of adjusting the aircraft's course to avoid contact with the object if there is sufficient time and distance to do so, and deactivate the FOD protection system 10; or maintain the present course and allow the FOD protection system to function. An alternative embodiment of the FOD system 10 can provide for automatic activation of the system upon detection of an object and a course correction if deemed feasible by the control unit 60. Embodiments of the FOD system 10 can be designed to be in compliance with Federal Aviation Administration and air traffic control ("ATC") regulations regarding aircraft course corrections.

The control unit 60 comprises a microcontroller 62 in electro-mechanical and fluid communication with the detector 20, optionally one or more pumps 50 and the aircraft flight control system 120. In an alternate embodiment, the FOD protection system 10 is a stand-alone system that is not integrated with the aircraft flight control system.

The foreign object detector 20 is a generally forward facing sensor 20, to detect the presence of objects within the field of view of the sensor 20. One or more sensors 20 may be mounted on each wing 130 of the aircraft. In embodiments, a sensor 20 may be mounted on the leading edge of each wing, close to the engine. In other embodiments a sensor 20 may be mounted on the engine, such as, within the cowling or fairing. Other embodiments may situate the sensor 20 at a forward location of the aircraft, such as, and for example only, proximate the nose 140 or windshield 150 of the aircraft. Other embodiments may employ the sensor at multiple locations to provide overlapping fields of view and enabling stereoscopic positioning of the foreign object as well as system redundancy. Depending upon the sensor 20 used, the sensor 20 could be mounted in a fixed position, or mounted to the aircraft such that it sweeps a varying field of view, by being mounted, for example, on a swiveling, pivoting or rotating base (not shown).

A detector 20 should be able to detect the presence of a moving object having a diameter of about 1 inch (about 2.54 cm). Thus, even a small bird, such as a starling, which is about 2-3 inches in diameter, and has a wingspan that is about 6-12 inches when in flight, can be readily detected.

The detector 20 could be selected from one or more different types of sensors, such as a radar sensor, a weather radar sensor, a weather radar sensor modified to detect objects at close ranges, an infra-red sensor, a forward-looking infrared sensor ("FLIR"), a light detection and ranging ("LIDAR") sensor, a motion sensor, a thermal sensor, a video camera, camera with motion sensor, or other sensors currently available or to be available in the future.

The engine 110 could be any jet engine, currently used or to be developed in the future, used to power an airframe, such as a fixed-wing aircraft, rotor craft such as helicopters, and other airframes that are capable of vertical take-offs and landings, and unmanned aircraft such as Unmanned Aerial Vehicles ("UAVs"); or other aircraft. Some details concerning aircraft engine components are shown herein for illustrative purposes; details that are common knowledge to those skilled in the art will be omitted.

Figure 5:
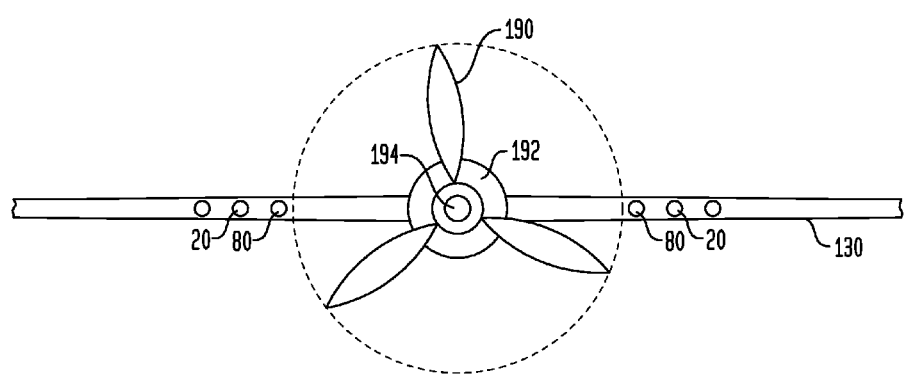
FIG. 5 shows the positioning of the detector and nozzles on a propeller-driven aircraft.

When used on propeller-operated aircraft, the detector would be positioned either at a distance that is beyond the radius of the propeller blades 190 (FIG. 5), or within the nose of the aircraft. Similarly, the nozzles 80 would be positioned away from the propeller blades, or if positioned behind the propeller blades, the system would be coupled with a synchronizer/interrupter mechanism to prevent fluid from striking and damaging the propeller.

The reservoir 40 could be any type of container employed on aircraft for holding liquids, such as a fuel tank or bladder, and can be stored either within the wings 130 or the fuselage 160 of the aircraft 150. On a passenger aircraft, the reservoir 40 could be positioned either proximate to or in a cargo hold 170 beneath the passenger compartment 180. The reservoir 40 is connected to one or more discharge nozzles 80 disposed on the aircraft 100 by a hose or tubing 90 or other means of fluid communication known to those skilled in the art.

Each reservoir 40 can be in fluid communication with one or more detector systems 20 on each side of the aircraft 100, or the reservoirs 40 may be in fluid communication with each other to provide both a greater amount of liquid available for targeting foreign objects, and/or ensure an even weight distribution within the aircraft. Optionally, each reservoir 40 could be pressurized prior to take-off, and/or could be pressurized either during a descent while landing, or whenever the aircraft flies below 18,000 ft altitude above sea level ("ASL") so the system is available for immediate action. The pressurizing system is shown as reference numeral 70, and is similar to systems utilized in commercial aircraft for pressurization, and generally includes a means for obtaining a combination of fresh air, and sometimes bleed air from a jet engine, and drawing it into the aircraft, after first being pressurized using a pump and/or compressor (not shown), and allowed to enter the cabin to achieve a specified environmental pressure. The pressure reservoir 70 is connected to the reservoirs 40 by a hose or tubing 72 capable of withstanding the particular pressures, as known to those skilled in the art.

Generally, a combination of fresh air, and sometimes bleed air from a jet engine, are drawn into the aircraft, after first being pressurized using a pump and/or compressor (not shown), and allowed to enter the cabin to achieve a specified environmental pressure. Fresh air can be brought in from outside the aircraft by a vent 74 on the aircraft, connected to the pressurization system 70 by tubing 76. Another line 78 connected to the engine allows bleed air to enter the pressurization system 70. Systems have also been developed to pressurize the cabin in the event of a sudden depressurization of the aircraft In embodiments, the system can be pressurized in the range of from about atmospheric pressure (about 14.7 pounds per square inch (("psi")) to about 1500 psi. In other embodiments, the system can be pressurized in the range of from about 100 psi to about 1000 psi. In other embodiments, the system can be pressurized in the range of about 500 psi to about 1000 psi. In these instances, the pump 50 functions to maintain the pressure needed for operation. An embodiment could include a heater (not shown) to maintain fluid at a temperature above its freezing point, but low enough to prevent boiling or fluid loss by evaporation.

Figure 4:
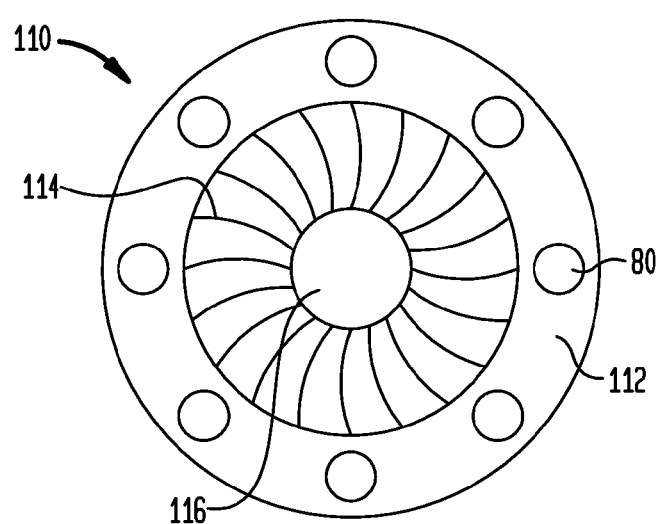
FIG. 4 shows an embodiment attached to an aircraft wing.

The engine 110 includes a cowling 112 surrounding the engine blades 114 and hub 116. (FIG. 4). A plurality of nozzles 80 are positioned in the cowling 112 and are distributed to surround the engine 110; reference numeral 118 refers to the engine exhaust exit. Each nozzle 80 is connected to a hose 90 that extends from the reservoir 40 and pump 50 through the engine mount 132. The pump distributes fluid 64 to each nozzle 80 as determined by control means 60 once the system has been activated.

Figure 2:
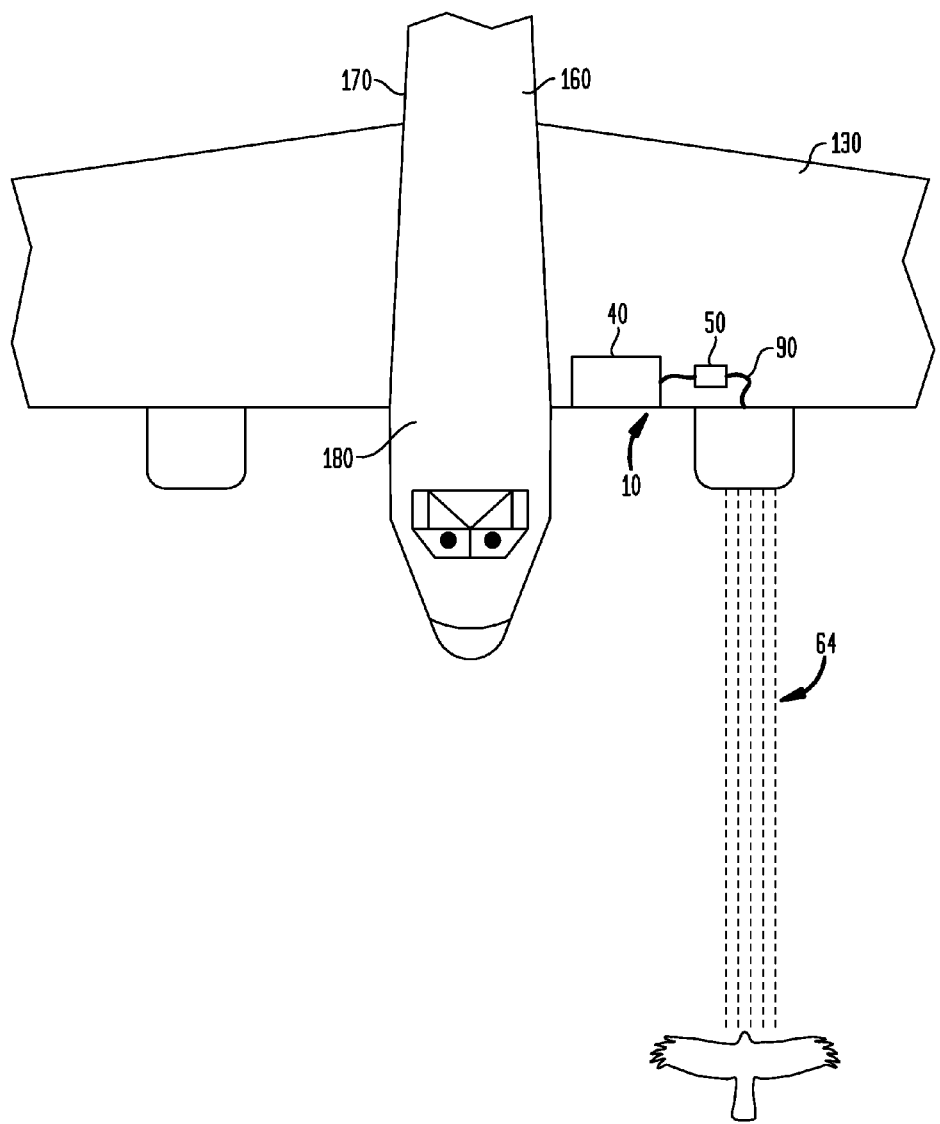
FIG. 2 illustrates operation of an embodiment of the present invention, using a different configuration of reservoir and pump than shown in FIG. 1.
Figure 3:
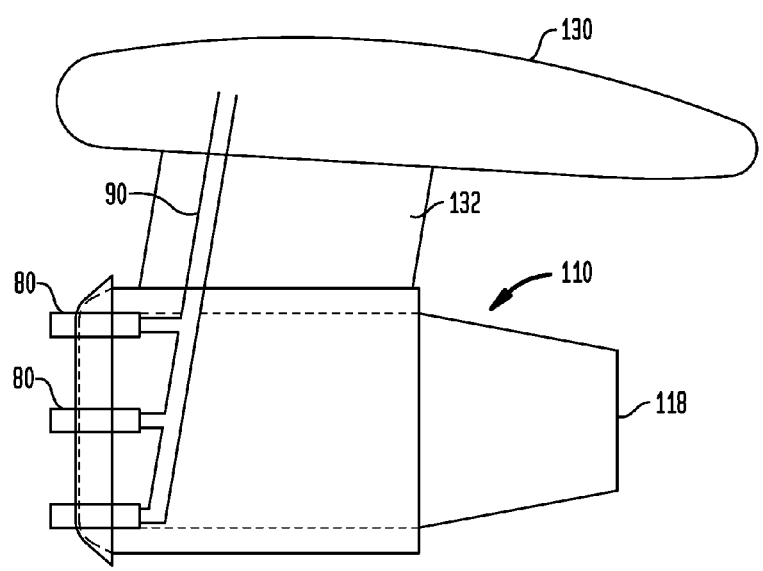
FIG. 3 shows the distribution of nozzles around a jet engine.

The fluid is pumped at a pressure that is sufficiently high to cause the fluid to be projected a distance of at least 30 meters in front of the aircraft. The nozzles 80 could be aligned such that the stream of fluid 64 ejected from each nozzle 80 generally coalesce and strike the foreign object (see FIG. 2).

The fluid 64 can be chosen from one or more liquids, and any fluid chosen for this type of application should have a freezing point sufficiently low so that it will not freeze, either while within the reservoir 40, pump 50, lines 90, nozzles 80 or while being ejected from the nozzles 80. Neither should the fluid, after discharge from the aircraft form pieces of ice of a size capable of damaging the aircraft should it strike either the engine or elsewhere on the aircraft. A liquid having a freezing point substantially lower than that of water (32 degrees F., 0 degrees Centigrade) would be desirable; such a liquid could be a deicing fluid that is commonly used to remove ice from aircraft or other objects. Non-limiting examples of such deicing liquids include, for example, ethylene glycol, propylene glycol (1,2-propylene glycol or 1,3-propylene glycol), diethylene glycol, glycerol, various mono- and polyethers of polyalcohols, such as ethylene glycol monomethyl ether, diethylene glycol monoalkyl ether, propylene glycol monoalkyl ether, methyl glucoside, sorbitol, sorbitol and glycerol mixture, 1,3-butylene glycol, 1,3-propanediol; salts of an organic acid such as lactic acid, for example sodium- or potassium lactate, salts such as potassium acetate, potassium carbonate, sodium chloride, magnesium chloride or calcium chloride or the like. These agents could be used either individually, or in various combinations thereof, as known to those skilled in the art, and could be obtained from one or more known manufacturers of deicing fluids. A colorant or dye can be added to the liquid so that the spray is visible. In embodiments, the colorant or dye may comprise up to about 0.25% of the composition by volume.

The fluid could be pumped at a steady flow rate, or a pump could be utilized that will pump the fluid through the nozzles in a pulsating manner, similar to the flow of a lawn sprinkler A pulsating fluid flow can conserve fluid, and also provide a greater impact than that provided by a steady stream of fluid.

Alternate nozzle embodiments can include a control mechanism to vary the output spray, similar to that of a commonly used item that is known to those skilled in the art, pistol-grip garden hose sprayer, or a linear garden hose sprayer. Either of these sprayers attach to the threaded end of a standard garden hose. In general terms, each of these sprayers comprise a hollow body through which a fluid, generally water will flow, and one end of the body is closed by a discharge means through which the fluid is output. The flow of the fluid within the nozzle is regulated by a variable control means contained in the nozzle body, and in the case of the pistol-grip sprayer, extends outward from the rear of the sprayer body. In the case of the linear sprayer, an adjustment means on the outside of the sprayer controls the fluid flow rate. In the case of the former, as the pistol-grip handle is tightened a valve is drawn backward and the intensity of the output spray increases. The rotation of this valve varies the pattern of the output spray, either causing it to be a broad spray, or for the output spray to become more focused. In the case of the linear hose sprayer, rotation of a collar on the sprayer body alters the spray pattern, from a broad and "slow" spray to a more focused spray that is output from the sprayer's nozzle at a higher speed.

In these alternate embodiments, nozzles containing similar fluid control mechanisms can be utilized in the foreign object detection system, and the fluid control means integrated into the circuitry of the foreign object system microcontroller, or into the circuitry of one or more of the aircraft's avionics systems. In embodiments, a foreign object deflection system can comprise a plurality of the "standard" nozzles 80, or a plurality of alternate nozzle embodiments as described. Another embodiment can include a combination of both "standard" nozzles 80 and the alternate nozzle embodiment described herein.

Figure 6:
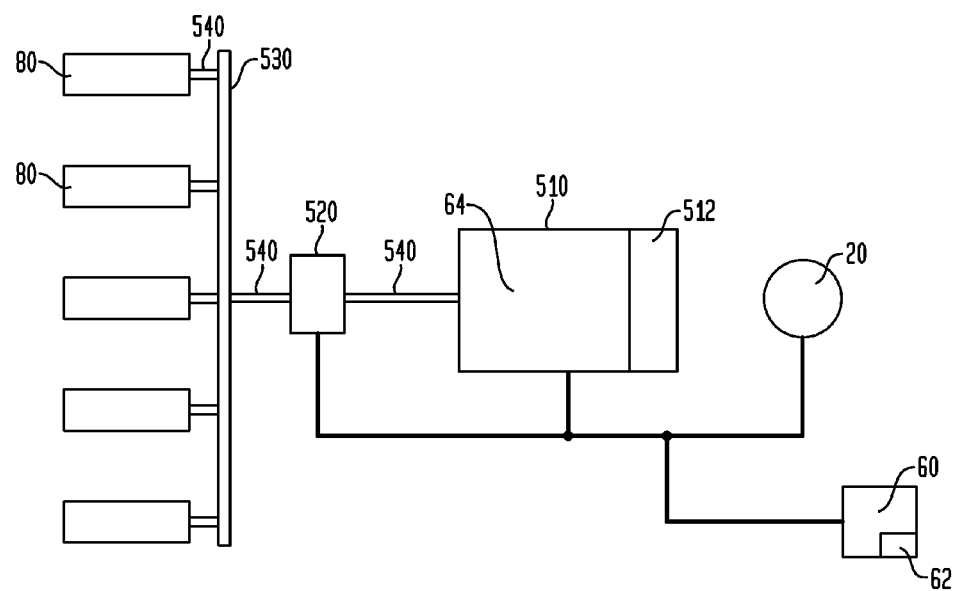
FIG. 6 is a schematic illustration of a system embodiment that operates independently of the aircraft cabin pressurization system.

An embodiment of the F.O.D. system (FIG. 6) functions independently of the aircraft's cabin pressurization system. The detector 20 is in electro-mechanical communication with the control means 60, a fluid reservoir 510 and valve 520. The nozzles 80 are in fluid communication with a manifold 530 that distributes fluid to each nozzle. The manifold 530 is in fluid communication with the fluid reservoir 510. The means for fluid communication 540 among these components is tubing or piping, capable of withstanding the appropriate pressures and environmental conditions of aviation, as known to those skilled in the art.

The fluid reservoir 510 can be a container including a piston 512 that is electro-mechanically controlled to exert pressure on the fluid 64 contained therein. The fluid reservoir 510 is in electro-mechanical communication with the control means 60, and will cause fluid 64 to be dispensed towards the nozzles 80 after receiving an appropriate command from the control means, once a foreign object has been detected and meets threshold parameters. A command from the control means will also cause valve 520 to open, so fluid can be distributed to the nozzles 80. Although a cylindrical configuration for the fluid reservoir 510 will probably perform best, other shapes could be utilized if they meet the pressure requirements and fluid capacity.

Most commercial aircraft, military aircraft and aircraft employed in general aviation have pressurized cabins for the comfort and safety of the passengers and crew. Generally, a combination of fresh air, and sometimes bleed air from a jet engine, are drawn into the aircraft, after first being pressurized using a pump and/or compressor (not shown), and allowed to enter the cabin to achieve a specified environmental pressure. Systems have also been developed to pressurize the cabin in the event of a sudden depressurization of the aircraft cabin, and these systems are designed to work within minutes of the depressurization event.

An alternative embodiment of the foreign object detection system 10 could employ compressed air from a standard aircraft pressurization system to propel the fluid 64 to each nozzle 80 once the system has been activated.

In one embodiment, the FOD system 10 is programmed to be armed based on a combination of aircraft speed and altitude above sea level. This is intended to prevent accidental discharge of the system or potential injury to airport ground and maintenance personnel, or other aircraft on the ground and in the immediate vicinity. Takeoff is a critical period when the aircraft is operating at a high level of thrust, and bird strikes have been common during this period and shortly thereafter as the aircraft is climbing to reach its final cruising altitude. The FOD system 10 can be armed when the aircraft has reached a particular speed, such as in excess of 50 knots, and is at an altitude below 18,000 ft ASL. Birds generally do not fly at this altitude or above.

Figure 7:
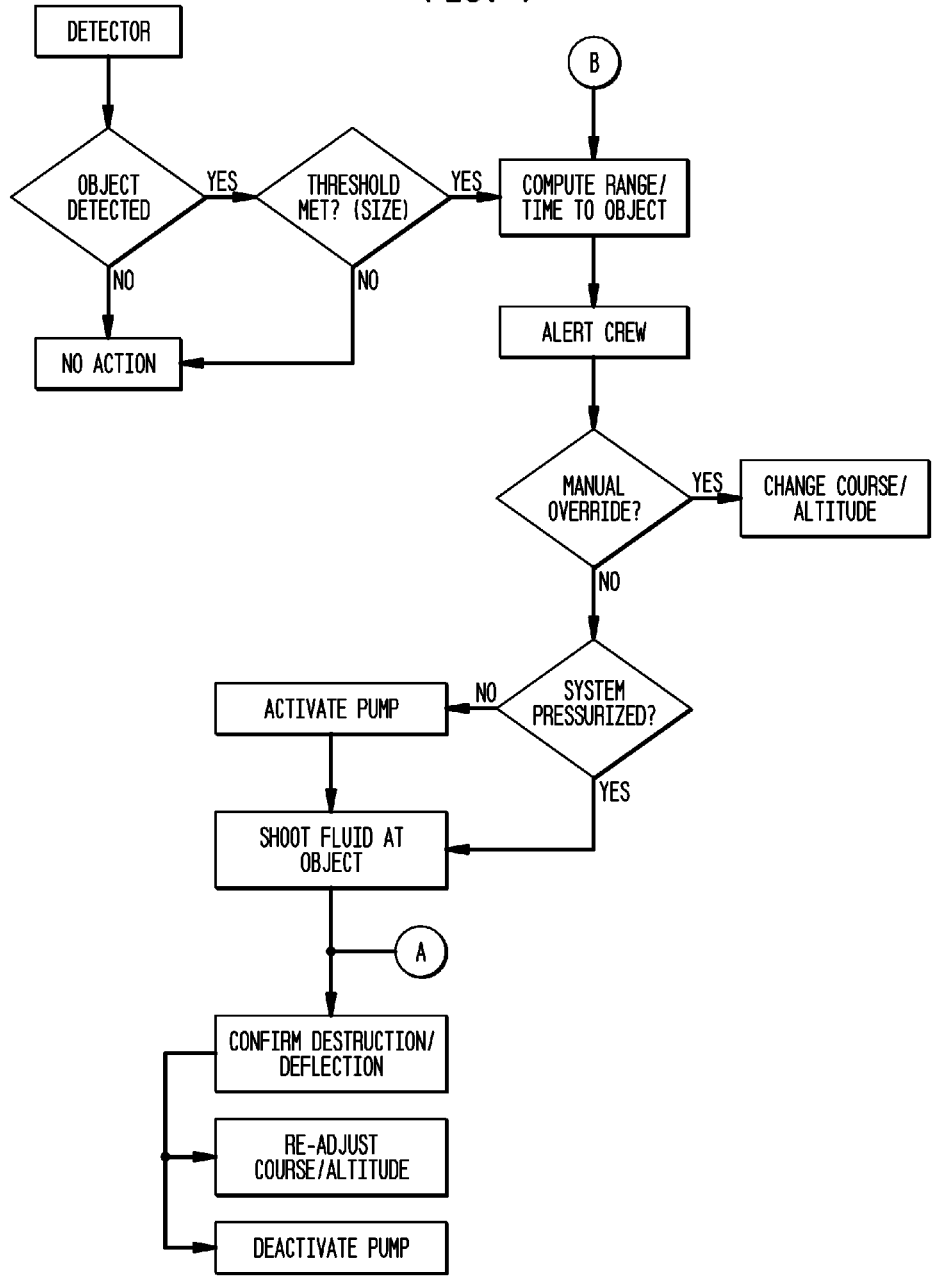
FIG. 7 is a flow chart summarizing the operation of an embodiment of the present invention.
Figure 8:
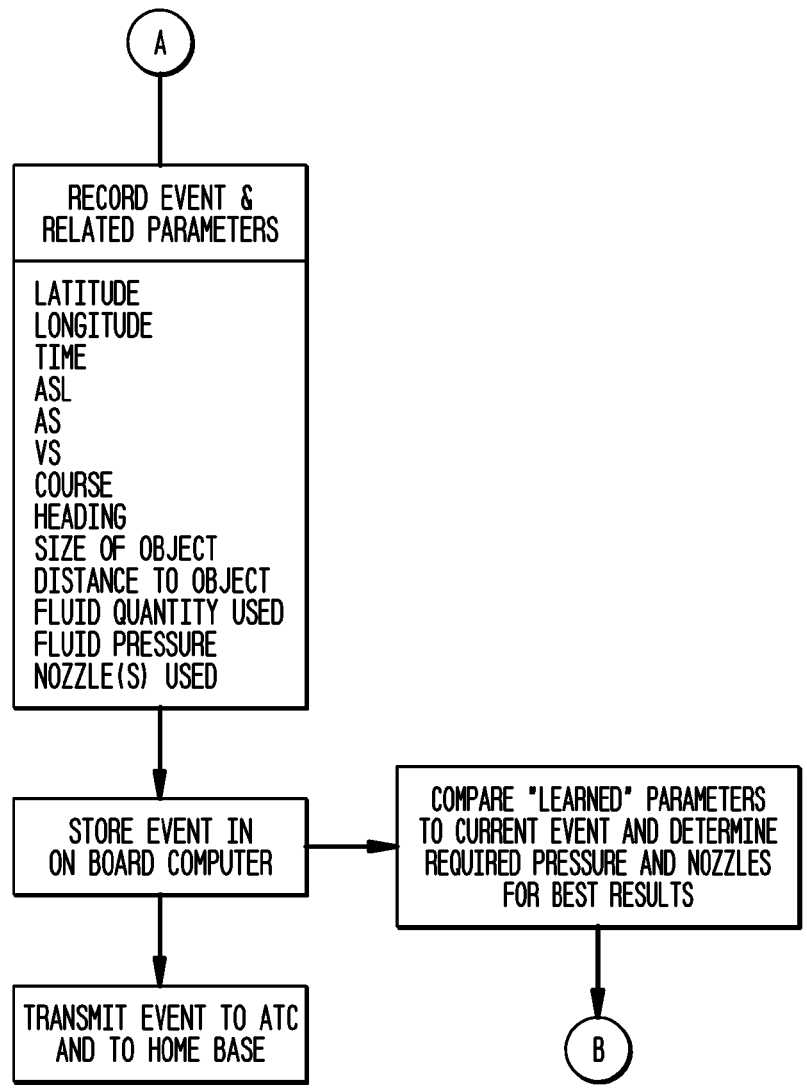
FIG. 8 is a flow chart summarizing the data reporting function and artificial intelligence functions of an embodiment of the present invention.

In one embodiment, the system operates in the following manner (FIG. 7). The detector 20 is in operation, and when a foreign object is detected that is within range of the detector 20, the detector 20, in conjunction with either the system's electronics and/or the aircraft's avionics system, determines whether the foreign object meets a threshold size and that a collision is likely, thereby activating the system. If the foreign object is determined to be beneath the threshold, no further action is taken. If the threshold size is met or exceeded, the foreign object protection system 10 is actuated. The system then computes the range of the object to the engine, determines whether the system is already pressurized, and if not pressurized, turns on the pump 50, causing fluid 64 to be shot from the nozzles 80 towards the oncoming object. In an alternate embodiment, the system electronics 60 are also integrated with one or more of the aircraft's avionics systems 120 to provide redundancy in case of failure.

In an alternate embodiment (FIG. 7), once a foreign object has been detected that exceeds the threshold size, the system 60 transmits an alert to the pilot, who has the option to manually override the system and change the course of the aircraft to avoid the foreign object. If the pilot chooses not to override the system, the system 60 determines whether the system is already pressurized, and if not pressurized, turns on the pump 50, as described in the preceding paragraph for the first embodiment, and fluid 64 is then shot at the foreign object in the manner described above.

In an alternate embodiment, recording software contained in either the system electronics 60 or microcontroller 62 could record each time the foreign object damage protection system 10 is actuated and fluid dispensed towards a foreign object. Among the parameters to be recorded include the location of the aircraft at the time of the incident (given as degrees latitude and degrees longitude, or as coordinates for a Global Positioning System), the altitude above sea level of the incident, actions taken by both the system and the aircraft crew (for example, a course correction, or a climb or a dive), total amount of fluid dispensed, amount of fluid dispensed from each dispensing means, size of the detected foreign object, distance to the foreign object at the time of detection, and the like. This information can be stored in a database and can then be used for various reporting and analytical purposes.

One such use would be reporting the incident to the FAA. This reporting could be done either in real-time, or at a specified time period, using the aircraft radio system or on-board computer communications means. This information could also be reported back to the home office of the airline, and/or to the aircraft owner if a private aircraft and/or to the aircraft manufacturer. The information contained on-board the aircraft could then be used in conjunction with an Artificial Intelligence software system, or other types of analytical software, to analyze data from a plurality of incidents, and determine a best course of action to be taken by the system in the event of future incidents.

Figure 9:
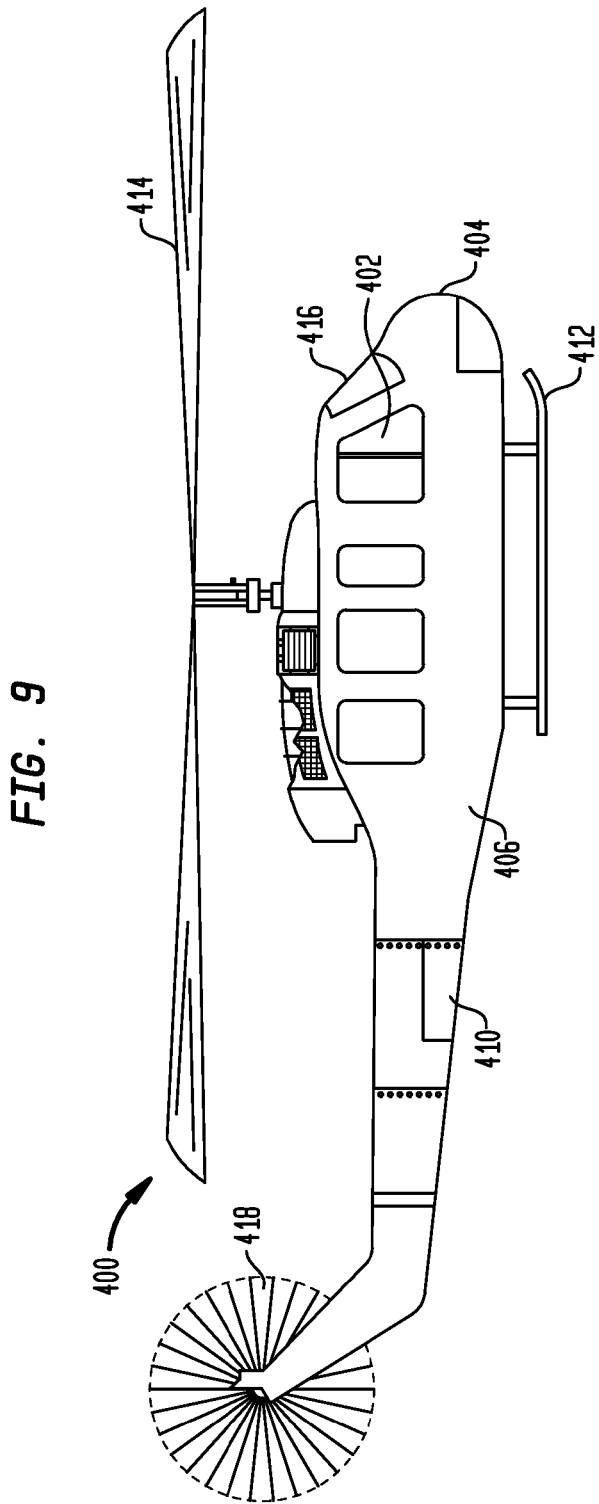
FIG. 9 is an embodiment of the present invention used on a helicopter.

For use on rotary aircraft such as a helicopter 400, detector 20 can be mounted either just above the cockpit 402, in the nose 404, or beneath the aircraft. The pump 50 and reservoir 40 can be mounted within the fuselage 406, either in the nose 404, in a rear compartment 410 or a pod 412, analogous to a weapons-containing pod, attached to the fuselage 406 or runners 412 of the aircraft (FIG. 9). Reference numerals 414, 416 and 418 refer to the main rotor, windshield and tail rotor of a typical helicopter. Similarly, the nozzles 80 should be mounted either in the nose 408, underneath the nose 408 or in a pod 412 on the side of the aircraft. Mounting the nozzles above the cockpit would not be preferable considering their proximity to the main rotor, and the effects of rotor wash.

Embodiments of the present invention can be used either to retrofit jet or propeller driven aircraft currently in use, or could be built onto new engines and/or airframes during the manufacturing process.

Although this invention has been described with a certain degree of particularity, it is to be understood that the present disclosure has been made only by the way of illustration, and that numerous changes in construction and arrangement of parts may be resorted to without departing from the spirit and scope of the invention.

I claim:

1. An aircraft having a system for protecting the aircraft from damage by a foreign object in the flight path of the aircraft, the system comprising:
   a sensor for detecting the foreign object, the sensor being attached to the aircraft;
   a reservoir located within the aircraft;
   a liquid contained in the reservoir;
   a means for dispensing the liquid, the means for dispensing the liquid in communication with the reservoir; and a control unit in communication with the sensor, the reservoir, and the means for dispensing the liquid;

whereby when the foreign object is detected by the sensor, the control unit causes the liquid to be dispensed from the reservoir through the means for dispensing into the flight path of the aircraft and towards the foreign object.

2. In an aircraft having a windscreen and an engine, a foreign object damage protection system for protecting the aircraft from damage by a foreign object, the foreign object protection system comprising:

a sensor for detecting a foreign object, the sensor being attached to the aircraft;
a reservoir contained within the aircraft;
a liquid contained in the reservoir;
a means for pressurizing the reservoir;
a means for dispensing the liquid, the means for dispensing the liquid in liquid communication with the reservoir; and
a control unit in communication with the sensor, the reservoir, and the means for dispensing the liquid, the control unit further comprising a means for activating the foreign object protection system;
whereby after the foreign object protection system has been activated, and a foreign object is detected by the sensor, the control unit causes the liquid to be dispensed through the means for dispensing into the flight path of the aircraft and towards the foreign object.

3. The system as described in claim 2, wherein the sensor is selected from the group consisting of a radar sensor, a weather radar sensor, a weather radar sensor modified to detect objects at short ranges, an infra-red sensor, a forward-looking infra-red sensor ("FLIR"), a light detection and ranging ("LIDAR" sensor, a motion sensor, a thermal sensor, a video sensor and a camera with motion sensor.

4. The system as described in claim 3, wherein the liquid is a deicing liquid selected from one or more members of the group consisting of ethylene glycol, propylene glycol (1,2-propylene glycol or 1,3-propylene glycol), diethylene glycol, glycerol, ethylene glycol monomethyl ether, diethylene glycol monoalkyl ether, propylene glycol monoalkyl ether, methyl glucoside, sorbitol, sorbitol, glycerol 1,3-butylene glycol, 1,3-propanediol; lactic acid, sodium lactate, potassium lactate, potassium acetate, potassium carbonate, sodium chloride, magnesium chloride and calcium chloride.

5. In an aircraft, a foreign object damage protection system for detecting a foreign object within the flight path of the aircraft, the system comprising:

a sensor for detecting the foreign object, the sensor attached to the aircraft;
a reservoir within the aircraft;
a liquid contained in the reservoir;
a means for pressurizing the reservoir;
a plurality of nozzles for dispensing the liquid, the nozzles being in liquid communication with the reservoir; and
a control unit in communication with the sensor, the reservoir, and the nozzles;
whereby when the foreign object is detected by the sensor, the control unit causes the liquid to be dispensed from the reservoir through the nozzles into the flight path of the aircraft and towards the foreign object.

6. The system as described in claim 5, wherein the sensor is attached to one or more locations on an aircraft, the location selected from the group consisting of proximate an aircraft engine, an aircraft wing, an aircraft nose and an aircraft windshield.

7. The system as described in claim 6, wherein the sensor is selected from the group consisting of a radar sensor, a weather radar sensor, a weather radar sensor modified to detect objects at short ranges, an infra-red sensor, a forward-looking infra-red sensor ("FLIR"), a light detection and ranging ("LIDAR") sensor, a motion sensor, a thermal sensor, a video sensor and a camera with motion sensor.

8. The system as described in claim 7, wherein the means for pressurizing pressurizes the reservoir prior to the aircraft taking flight.

9. The system as described in claim 7, wherein the means for pressurizing pressurizes the reservoir after the aircraft has taken flight.

10. The system as described in claim 9 wherein the liquid is a deicing liquid selected from one or more members of the group consisting of ethylene glycol, propylene glycol (1,2-propylene glycol or 1,3-propylene glycol), diethylene glycol, glycerol, ethylene glycol monomethyl ether, diethylene glycol monoalkyl ether, propylene glycol monoalkyl ether, methyl glucoside, sorbitol, sorbitol, glycerol 1,3-butylene glycol, 1,3-propanediol; lactic acid, sodium lactate, potassium lactate, potassium acetate, potassium carbonate, sodium chloride, magnesium chloride and calcium chloride.

11. The system as described in claim 10, wherein the nozzle is mounted proximate one or more locations selected from the group consisting of a fuselage, a wing, a nose, a windshield, a tail, an engine, a propeller and a rotor.

12. The system as described in claim 11, wherein the fluid is dispensed to a distance at least 30 meters from the aircraft.

13. The system as described in claim 12, further comprising a means for distributing the fluid from the reservoir to the plurality of nozzles.

14. The system as described in claim 5, wherein the nozzles are mounted in an engine nacelle of the aircraft.

15. The system as described in claim 5, wherein the nozzles are mounted in a nose of the aircraft.

16. The system as described in claim 5, wherein the nozzles are mounted in a wing of the aircraft.

17. The system as described in claim 5, wherein the nozzles are mounted in a tail of the aircraft.

* * * * *